US011258591B2

(12) United States Patent
Feng et al.

(10) Patent No.: US 11,258,591 B2
(45) Date of Patent: Feb. 22, 2022

(54) CRYPTOGRAPHIC KEY MANAGEMENT BASED ON IDENTITY INFORMATION

(71) Applicant: Advanced New Technologies Co., Ltd., Grand Cayman (KY)

(72) Inventors: Zhiyuan Feng, Hangzhou (CN); Yanpeng Li, Hangzhou (CN); Long Cheng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/348,413

(22) Filed: Jun. 15, 2021

(65) Prior Publication Data

US 2021/0314150 A1    Oct. 7, 2021

Related U.S. Application Data

(63) Continuation of application No. 16/945,341, filed on Jul. 31, 2020, now Pat. No. 11,063,749, which is a
(Continued)

(51) Int. Cl.
*H04L 29/06* (2006.01)
*H04L 9/08* (2006.01)
*H04L 9/32* (2006.01)

(52) U.S. Cl.
CPC .......... *H04L 9/0825* (2013.01); *H04L 9/0866* (2013.01); *H04L 9/0877* (2013.01); *H04L 9/3231* (2013.01); *H04L 9/3247* (2013.01)

(58) Field of Classification Search
None
See application file for complete search history.

(56) References Cited

U.S. PATENT DOCUMENTS

| 6,031,910 A | 2/2000 | Deindl et al. |
| 7,340,462 B2 | 3/2008 | Bertrand |

(Continued)

FOREIGN PATENT DOCUMENTS

| CN | 201126581 | 10/2008 |
| CN | 101436247 | 5/2009 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Andrew J Steinle
(74) *Attorney, Agent, or Firm* — Fish & Richardson P.C.

(57) ABSTRACT

Disclosed herein are methods, systems, and apparatus, including computer programs encoded on computer storage media, for managing cryptographic keys based on user identity information. One of the methods includes receiving a request to store identity information and a user key pair to a memory on a chip, the request being digitally signed with a digital signature, the identity information uniquely identifying the user, and the user key pair being assigned to the user; determining that the digital signature is authentic based on a public key pre-stored in the memory; encrypting the identity information and the user key pair; and storing the identity information and the user key pair to the memory.

20 Claims, 7 Drawing Sheets

Related U.S. Application Data continuation of application No. 16/588,106, filed on Sep. 30, 2019, now Pat. No. 11,088,831, which is a continuation of application No. PCT/CN2019/080366, filed on Mar. 29, 2019.

(56) References Cited

U.S. PATENT DOCUMENTS

| | | |
|---|---|---|
| 7,707,225 B2 | 4/2010 | Akashika et al. |
| 8,775,757 B2 | 7/2014 | Polzin et al. |
| 8,832,465 B2 | 9/2014 | Gulati et al. |
| 9,559,737 B2 | 1/2017 | Shriya et al. |
| 10,079,677 B2 | 9/2018 | Benson et al. |
| 10,116,440 B1 | 10/2018 | Rudzitis et al. |
| 10,536,271 B1 | 1/2020 | Mensch et al. |
| 2005/0027991 A1 | 2/2005 | DiFonzo |
| 2005/0044375 A1 | 2/2005 | Paatero et al. |
| 2006/0059372 A1 | 3/2006 | Fayar et al. |
| 2006/0078109 A1 | 4/2006 | Akashika et al. |
| 2006/0149962 A1 | 7/2006 | Fountain et al. |
| 2006/0259782 A1 | 11/2006 | Wang et al. |
| 2008/0178009 A1 | 7/2008 | Funahashi |
| 2008/0192937 A1 | 8/2008 | Challener |
| 2008/0215890 A1 | 9/2008 | Buer |
| 2009/0065591 A1 | 3/2009 | Paul et al. |
| 2009/0235068 A1 | 9/2009 | Soug et al. |
| 2009/0282260 A1 | 11/2009 | Tattan et al. |
| 2010/0161992 A1 | 6/2010 | Schuetze et al. |
| 2011/0126024 A1 | 5/2011 | Beatson et al. |
| 2011/0302420 A1 | 12/2011 | Davida |
| 2012/0131350 A1 | 5/2012 | Atherton |
| 2012/0303966 A1 | 11/2012 | Hubner |
| 2013/0061044 A1 | 3/2013 | Pinkus et al. |
| 2013/0147603 A1 | 6/2013 | Malhas et al. |
| 2013/0276074 A1 | 10/2013 | Orsini et al. |
| 2013/0305055 A1 | 11/2013 | Atherton |
| 2013/0308838 A1 | 11/2013 | Westemman et al. |
| 2014/0025581 A1 | 1/2014 | Calman |
| 2014/0089617 A1 | 3/2014 | Polzin et al. |
| 2014/0089682 A1 | 3/2014 | Gulati et al. |
| 2014/0108786 A1 | 4/2014 | Kreft |
| 2014/0122508 A1 | 5/2014 | Eigner et al. |
| 2014/0237256 A1 | 8/2014 | Ben Ayed |
| 2014/0267476 A1 | 9/2014 | Simpson et al. |
| 2015/0006914 A1 | 1/2015 | Oshida |
| 2015/0046707 A1 | 2/2015 | Atherton |
| 2015/0095999 A1 | 4/2015 | Toth |
| 2015/0242607 A1 | 8/2015 | Morris et al. |
| 2015/0270962 A1 | 9/2015 | Hautier et al. |
| 2015/0295908 A1 | 10/2015 | O'Hare et al. |
| 2015/0303964 A1 | 10/2015 | Shriya et al. |
| 2016/0072801 A1 | 3/2016 | Cao et al. |
| 2016/0224776 A1 | 8/2016 | Leow |
| 2016/0275461 A1 | 9/2016 | Sprague et al. |
| 2016/0349999 A1 | 12/2016 | Adler et al. |
| 2016/0359965 A1 | 12/2016 | Murphy et al. |
| 2016/0365983 A1 | 12/2016 | Shahabuddin et al. |
| 2017/0118018 A1 | 4/2017 | Dekker et al. |
| 2017/0134348 A1 | 5/2017 | Roth et al. |
| 2017/0213211 A1* | 7/2017 | Sibert ............... G06Q 20/4014 |
| 2017/0270509 A1 | 9/2017 | Colegate et al. |
| 2017/0357967 A1 | 12/2017 | Sykora et al. |
| 2017/0373843 A1 | 12/2017 | Benson et al. |
| 2017/0373844 A1 | 12/2017 | Sykora et al. |
| 2018/0173871 A1 | 6/2018 | Toth |
| 2018/0181739 A1 | 6/2018 | Zhong et al. |
| 2018/0287792 A1 | 10/2018 | Fu |
| 2018/0293387 A1* | 10/2018 | Bar-El .................... G06F 21/00 |
| 2018/0309581 A1 | 10/2018 | Butler et al. |
| 2018/0367311 A1 | 12/2018 | Stahlberg et al. |
| 2019/0019144 A1* | 1/2019 | Gillen .................. H04L 9/3242 |
| 2019/0026724 A1 | 1/2019 | Wade et al. |
| 2019/0028283 A1 | 1/2019 | Sharifi et al. |
| 2019/0028284 A1 | 1/2019 | Rezayee et al. |
| 2019/0095671 A1 | 3/2019 | Yeke Yazdandoost et al. |
| 2019/0116049 A1 | 4/2019 | Ittogi et al. |
| 2019/0305949 A1 | 10/2019 | Hamel et al. |
| 2019/0305952 A1 | 10/2019 | Hamel et al. |
| 2020/0004967 A1 | 1/2020 | Fu et al. |

FOREIGN PATENT DOCUMENTS

| | | |
|---|---|---|
| CN | 101467430 | 6/2009 |
| CN | 101764694 | 6/2010 |
| CN | 102594843 | 7/2012 |
| CN | 103138927 | 6/2013 |
| CN | 104239815 | 12/2014 |
| CN | 105975839 | 9/2016 |
| CN | 106301767 | 1/2017 |
| CN | 106790183 | 5/2017 |
| CN | 107241317 | 10/2017 |
| CN | 104580107 | 2/2018 |
| CN | 108418677 | 8/2018 |
| CN | 108540457 | 9/2018 |
| CN | 108881000 | 11/2018 |
| CN | 108900296 | 11/2018 |
| CN | 109150535 | 1/2019 |
| CN | 109525392 | 3/2019 |
| EP | 1175749 | 1/2002 |
| EP | 1370022 | 12/2003 |
| JP | 10247906 | 9/1998 |
| JP | 2000011101 | 1/2000 |
| JP | 2001319164 | 11/2001 |
| JP | 2003337875 | 11/2002 |
| JP | 2003110552 | 4/2003 |
| JP | 2004104539 | 4/2004 |
| JP | 2005517348 | 6/2005 |
| JP | 2006079181 | 3/2006 |
| JP | 2006079191 | 3/2006 |
| JP | 2006221566 | 8/2006 |
| JP | 2006295916 | 10/2006 |
| JP | 2006350429 | 12/2006 |
| JP | 2007018301 | 1/2007 |
| JP | 2008198186 | 8/2008 |
| JP | 2017183930 | 10/2017 |
| JP | 2018124959 | 8/2018 |
| KR | 20090058570 | 6/2009 |
| KR | 20180089668 | 8/2018 |
| TW | 200949603 | 12/2009 |
| TW | 201328280 | 7/2013 |
| TW | 201638798 | 11/2016 |
| TW | 201729136 | 8/2017 |
| TW | 201741922 | 12/2017 |
| TW | 201810111 | 3/2018 |
| TW | 201901551 | 1/2019 |
| WO | WO 2004014017 | 2/2004 |
| WO | WO 2018166356 | 9/2018 |

OTHER PUBLICATIONS

Extended European Search Report in European Application No. 19732221.7, dated Sep. 8, 2020, 11 pages.

Extended European Search Report in European Patent Application No. 19732215.9, dated Mar. 25, 2020, 7 pages.

Extended European Search Report in European Patent Application No. 19732220.9, dated Jun. 16, 2020, 6 pages.

Extended European Search Report in European Patent Application No. 19732240.7, dated May 15, 2020, 9 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/080366, dated Jan. 3, 2020, 6 pages.

PCT International Search Report and Written Opinion in International Application No. PCT/CN2019/080372, dated Dec. 27, 2019, 6 pages.

PCT International Search Report and Written Opinion in International Application No. PCT/CN2019/080384, dated Dec. 27, 2019, 7 pages.

(56) References Cited

OTHER PUBLICATIONS

PCT International Search Report and Written Opinion in International Application No. PCT/CN2019/080393, dated Dec. 27, 2019, 8 pages.

* cited by examiner

CRYPTOGRAPHIC KEY MANAGEMENT BASED ON IDENTITY INFORMATION

CROSS-REFERENCE TO RELATED APPLICATIONS

This application is a continuation of U.S. patent application Ser. No. 16/945,341, filed on Jul. 31, 2020, which is a continuation of U.S. patent application Ser. No. 16/588,106, filed on Sep. 30, 2019, which is a continuation of PCT Application No. PCT/CN2019/080366, filed on Mar. 29, 2019, each application is hereby incorporated by reference in its entirety.

TECHNICAL FIELD

This specification relates to identity authentication technology and data security.

BACKGROUND

Identity authentication technology is commonly used in computer networks to verify user identity and ensure data security. Identity information, as other information digitally stored or communicated in the computer networks, can be represented by a set of data. Computers can identify and authenticate a user based on a digital identity of the user. For data security, it is important to ensure that a digital identity belongs to an authorized user, or in other words, the digital identity matches the actual identity of the user.

As technology has evolved, decentralized systems, such as blockchain networks and Internet of things (IoT) networks have emerged. Under decentralized systems, it is possible for individuals to safely self-store their own identity information. For example, a user can hold a digital wallet, which stores a private key that the user can use to add a digital signature to authorize transactions in a blockchain network or on IoT devices. The private key is normally stored as a data string with cryptographic semantics on a computing device and is intended to be only accessible to the user. As other data strings, the private key can potentially be copied and shared. Any users who have the private key can control digital assets associated with the private key. Moreover, the digital assets cannot be retrieved if the private key is lost. Therefore, secure storage and efficient use of cryptographic keys can be important.

It would be desirable to develop a key management technology that can efficiently verify a user's identity information and safely manage cryptographic keys for the user.

SUMMARY

This specification describes technologies for managing user cryptographic keys assigned to a user based on identity information that uniquely identifies the user. These technologies generally involve receiving, by an identity cryptographic chip (ICC), the identity information and the user cryptographic keys, the identity information and the user cryptographic keys being digitally signed with a digital signature that is generated by a private key assigned to a master user, determining that the digital signature is authentic based on a public key assigned to the master user, the public key being pre-stored in a memory on the ICC, and encrypting and storing the identity information and the user cryptographic keys to the memory.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

This specification describes technologies for managing user cryptographic keys assigned to a user based on identity information that uniquely identifies the user. These technologies generally involve receiving, by an identity cryptographic chip (ICC), the identity information and the user cryptographic keys, the identity information and the user cryptographic keys being digitally signed with a digital signature that is generated by a private key assigned to a master user, determining that the digital signature is authentic based on a public key assigned to the master user, the public key being pre-stored in a memory on the ICC, and encrypting and storing the identity information and the user cryptographic keys to the memory.

Figure 1:
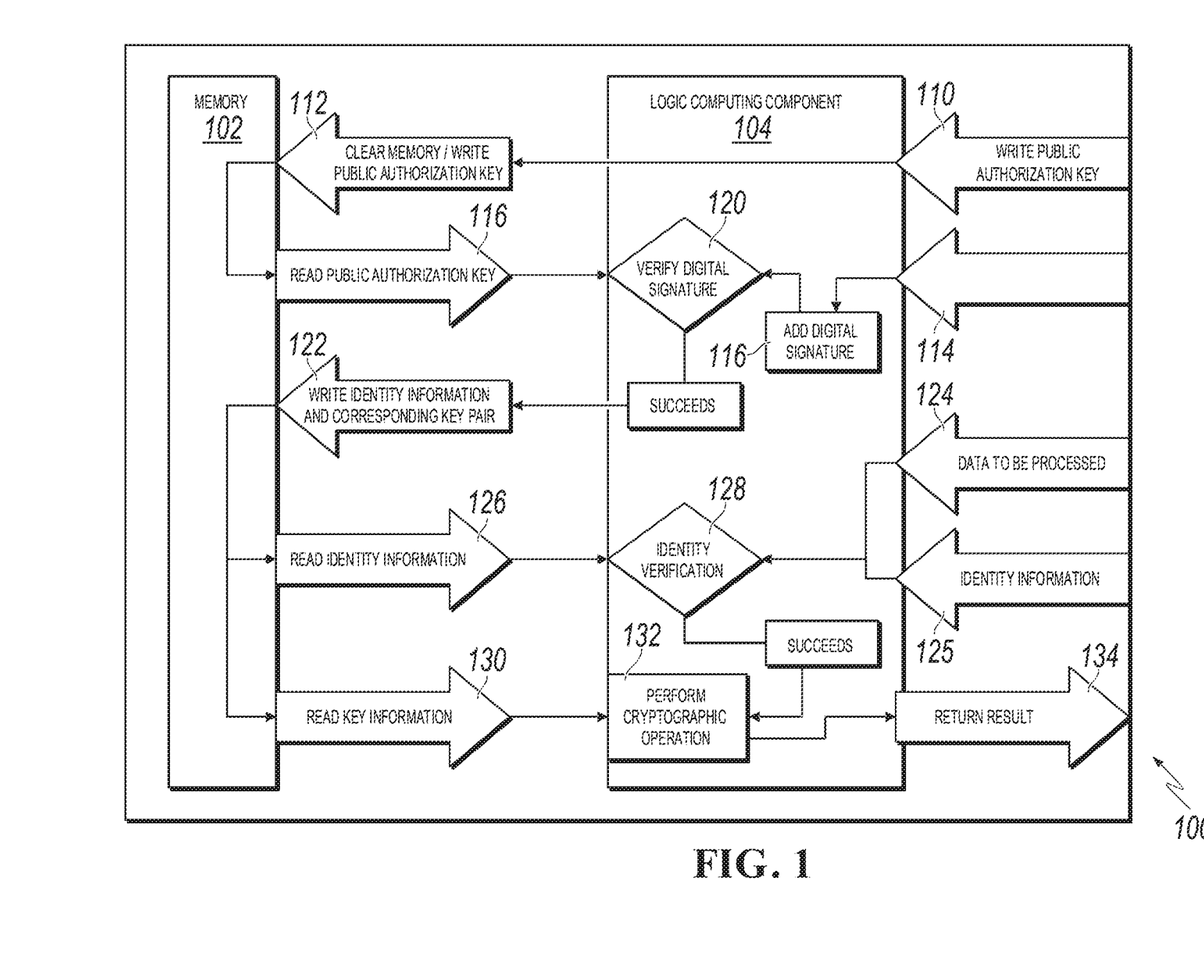
FIG. 1 is a diagram illustrating an example of an identity cryptographic chip for performing processes that can be used to execute embodiments of this specification.

FIG. 1 is a diagram illustrating an example of an ICC 100 for performing processes that can be used to execute embodiments of this specification. At a high-level, the ICC 100 can be a computer chip that includes a memory 102 and a logic computing component 104. The ICC 100 can be used for securely performing cryptographic operations. In some embodiments, the ICC 100 can be a chip set that includes one or more chip components. The memory 102 and the logic computing component 104 can be integrated to different chip components. In some embodiments, the memory 102 can be used to provide permanent storage. In some examples, the memory 102 can be a programmable read-only memory (PROM) that allows data to be written once and is read-only afterwards. In some examples, the memory 102 can be an electrically erasable programmable read-only memory (EEPROM) or a Flash memory which can be reformatted and reprogrammed. In some embodiments, the logic computing component can be an application specific integrated circuit (ASIC) or a single chip microcomputer (SCM).

In some computer networks, cryptography is implemented to maintain privacy of data or transactions. For example, if two users want to keep a transaction private, such that other users cannot discern details of the transaction, the users can encrypt the transaction data. Example cryptographic operations include, without limitation, symmetric key encryption and asymmetric key encryption. Symmetric encryption refers to an encryption process that uses a single key for both encryption (generating ciphertext from plaintext), and decryption (generating plaintext from ciphertext).

Asymmetric encryption uses key pairs that each include a private key, and a public key, the private key being known only to a respective user, and the public key that can be disseminated openly. A user can use the public key of another user to encrypt data, and the encrypted data can be decrypted using the private key of the other user.

Asymmetric encryption can be used to provide digital signatures, which enable participants in a transaction to confirm other participants in the transaction, as well as the validity of the transaction. For example, a user can digitally sign a message, and another user can confirm that the message was sent by the user based on the digital signature. Digital signatures can also be used to ensure that messages are not tampered with in transit. For example, user A is to send a message to user B. User A generates a hash of the message, and then, using its private key, encrypts the hash to provide a digital signature as the encrypted hash. User A appends the digital signature to the message, and sends the message with the digital signature to user B. User B decrypts the digital signature using the public key of user A, and extracts the hash. User B hashes the message and compares the hashes. If the hashes are same, user B can confirm that the message was indeed from user A, and was not tampered with.

The ICC 100 can be used for securely performing cryptographic operations based on verifying user identity information. The memory 102 can be used to store trusted user identity information and cryptographic key information. The memory 102 can also store identity authentication algorithms (e.g., as computer-executable code) and cryptographic operation algorithms (e.g., as computer-executable code). In some embodiments, information and algorithms stored in the memory 102 are encrypted to prevent leakage thereof, even when the ICC 100 is reverse engineered. When a request for performing a cryptographic operation is received from a user, the logic computing component 104 can use identity information collected from the user and the trusted user identity information stored in memory 102 to verify the identity of the user based on the identity authentication algorithm. For example, if the identity information is a fingerprint image of a fingerprint of the user, the identity authentication algorithm can be a local authentication algorithm that compares the fingerprint image collected from the user and a stored fingerprint image. If the collected fingerprint image matches the stored fingerprint image, the identity of the user is successfully verified. The logic computing component 104 can then use the stored cryptographic key information to perform the requested cryptographic operation. After the cryptographic operation is performed, the operation result can be output by the ICC 100. By using the ICC 100, cryptographic operations can be performed only after an identity of the user is verified or authenticated. As such, the authority of the user to perform the operations can be guaranteed. Moreover, since the cryptographic keys are stored in the ICC 100 as ciphertext, the cryptographic operations are performed inside the ICC 100. Only the operation result is output from the ICC 100. In this manner, security of the cryptographic keys can be ensured.

In some embodiments, a master user of the ICC 100 can use public authorization keys to provide users with access to the ICC 100. The master user can be a manager, a network administrator, an owner, or an issuer of the ICC 100. In short, the master user is a user that is in control of the ICC 100, and an authorization key pair is assigned to the master user. The authorization key pair includes a public authorization key and a private authorization key that enables the master user (or the ICC 100 executing on behalf of the master user) to participate in asymmetrically encrypted communications, and/or perform cryptographic operations (e.g., encryption, decryption). At 110, the public authorization key is written to the ICC 100.

At 112, the memory content is cleared and the public authorization key is written to the memory 102. In some embodiments, the memory 102 is a permanent storage memory. In some embodiments, to prevent tampering, the public authorization key can only be written to a storage unit of the memory 102 once. If a new public authorization key needs to be used to replace the existing public authorization key, the content of the memory 102 may be erased before the new public authorization key can be written. In some embodiments, the public authorization key can be encrypted before writing to the memory 102 to enhance security.

At 114, identity information of a user and a cryptographic key pair of the user are input to the ICC 100. The cryptographic key pair includes a public user key and a private user key that enable the user (or computing device executing on behalf of the user) to participate in asymmetrically encrypted communications, and/or perform cryptographic operations (e.g., encryption, decryption). In some embodiments, the identity information can be biometric information of the user. Examples of biometric information include, without limitation, fingerprint, voiceprint, heartbeat, and iris information. At 116, a digital signature can be added to the identity information and the cryptographic key pair. In some embodiments, the master user can add the digital signature to the input identity information and the cryptographic key pair. The private authorization key assigned to the master user can be used to generate the digital signature. In some embodiments, the private authorization key can also be issued by the master user to a trusted user. The trusted user can use the private authorization key to directly sign the identity information and the cryptographic key pair. At 118, the public authorization key is read from the memory 102 to verify the digital signature at 120. If the verification succeeds, the user is determined to be authorized to use the ICC 100 for performing cryptographic operations.

At 122, the identity information and the cryptographic key pair are written to the memory 102 for storage. In some embodiments, the identity information and the cryptographic key pair can be encrypted before writing to the memory 102 to enhance security. In some embodiments, the public authorization key can be used to encrypt the identity information and the cryptographic key pair. In some embodiments, the identity information and the cryptographic key pair can be written to separate storage units of the memory 102.

At 124, a request for performing a cryptographic operation is sent by a user to the ICC 100. In some embodiments, the data that the cryptographic operation is to be performed on can also be sent to the ICC 100. For example, if the cryptographic operation is encryption, the corresponding data can be a data file that is to be encrypted. At 125, the identity information of the user is collected and sent to the ICC 100. At 126, the identity information written to the memory 102 at 122 is read from the memory 102 to perform identity verification at 128. The identity verification can be performed based on comparing the identity information received at 125 with the stored identity information. If the identity information matches, the verification is successful and the cryptographic key information is read from the memory 102 at 130 to perform the cryptographic operation at 132. If the identity information does not match, the verification is unsuccessful, and the request for performing the cryptographic operation can be declined. In some embodiments, the identity verification can be performed using an identity verification algorithm based on the particular type of identity information received. In some embodiments, the cryptographic operation can be performed based on a cryptographic operation algorithm. As described above, the cryptographic operation can be encryption, decryption, or adding digital signature to the data. After performing the cryptographic operation, the operation result can be output at 134.

As described above, the ICC 100 can create a trusted environment within hardware for authorized users to securely perform cryptographic operations. For example, a master user who owns the ICC 100 can authorize multiple users to store their identity information and cryptographic key pairs to the ICC 100. Information requested by the users to be stored is digitally signed by the private authorization key of the master user. The authenticity of the digital signature can be verified by the public authorization key of the master user, which is pre-stored in the ICC 100. If the digital signature is authentic, the corresponding identity information and cryptographic key pair can be stored in the ICC 100.

When a cryptographic operation is requested by a user, the ICC 100 can retrieve identity information and the cryptographic key pair for the particular user from memory. The identity information can be used to verify the identity of the user, and the cryptographic key pair can be used to perform the requested cryptographic operation after the identity of the user is verified. The cryptographic operation can be performed for various practical scenarios. For example, the cryptographic operation can be an operation to add a digital signature to a blockchain transaction. In this example, a node A (e.g., a computing device operating on behalf of a user) can be a computing device within a blockchain network that initiates a request to digitally sign blockchain transaction data with a node B. The blockchain transaction data can be a hashed value of the transaction data between the node A and the node B. The node A can use the ICC 100 to generate the digital signature to the hashed transaction data. To use the ICC 100, identity information associated with the node A is collected and compared with the identity information stored in the ICC 100. If the collected identity information matches the stored identity information, the node A can be authorized for execution of cryptographic operations using the ICC 100. More particularly, a private key of the cryptographic key pair can be read from the memory of the ICC 100 to generate a digital signature to the hashed transaction data. The node A can then send hashed transaction data with digital signature to the node B. The node B decrypts the digital signature using the public key of the cryptographic key pair and extracts the hash. The node B hashes the message and compares the hashes. If the hashes are same, the node B can confirm that the message was indeed from the node A and was not tampered with.

Figure 2:
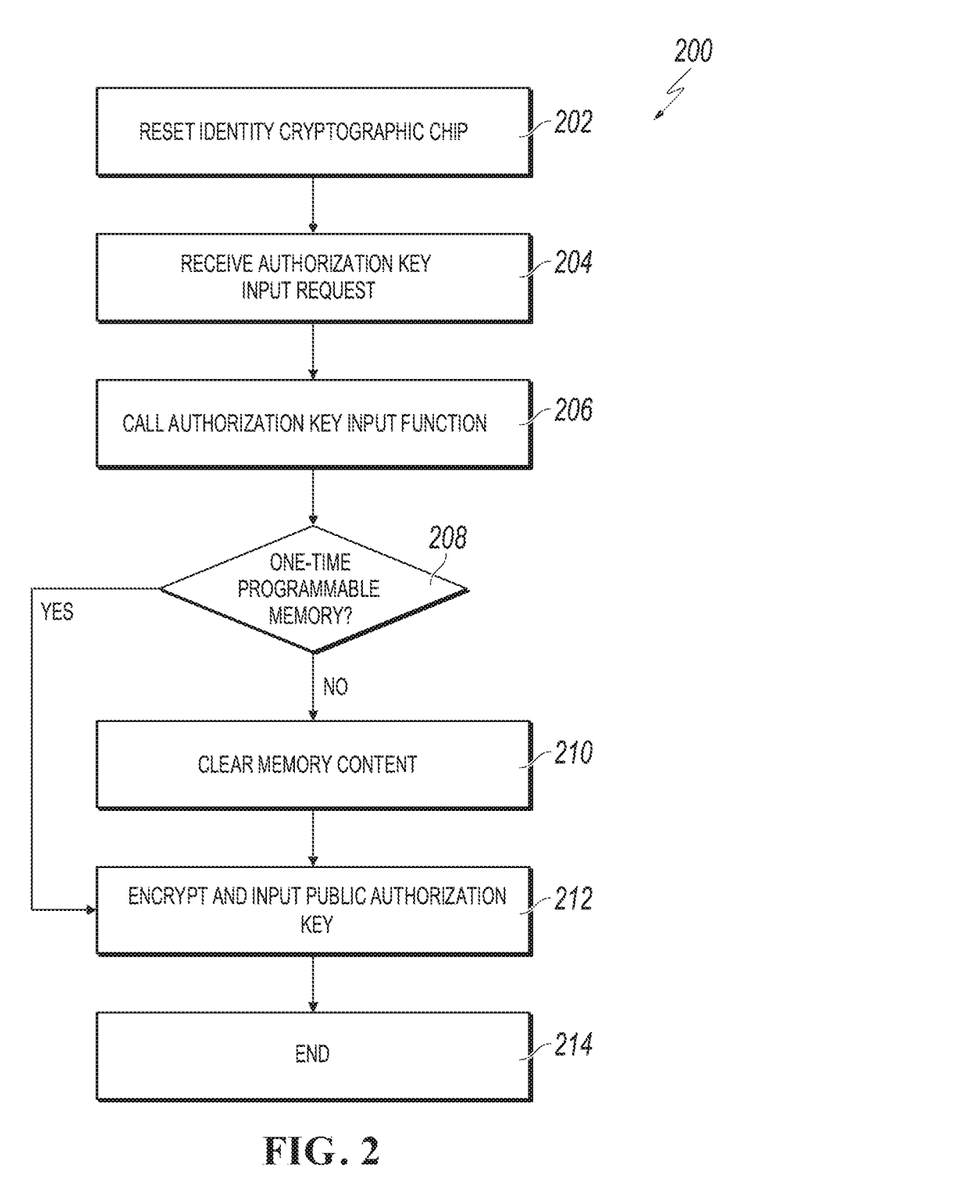
FIG. 2 is a flowchart illustrating an example of a process for identity cryptographic chip initialization in accordance with embodiments of this specification.

FIG. 2 is a flowchart illustrating an example of a process 200 for ICC initialization in accordance with embodiments of this specification. In some embodiments, the ICC is initialized by a master user such as a manager, a network administrator, or an issuer of the ICC. In some embodiments, the master user can control which users are authorized to use the ICC to securely perform cryptographic operations.

At 202, the ICC is reset. In some embodiments, the ICC is reset in response to receiving a request to input a public authorization key. In some embodiments, resetting the ICC can include erasing or reformatting content stored in the memory of the ICC. In some embodiments, resetting the ICC can also include reconfiguring or resetting settings of the logic computing component of the ICC to default. By resetting the ICC, it can be guaranteed that one public authorization key is used to control information input to the ICC. Moreover, any identity information and cryptographic key pairs previously stored in the ICC are erased to ensure data security. In some embodiments, the ICC is a new ICC and is used for the first time, the ICC can be initialized to accept input of a public authorization key. In some embodiments, the public authorization key can be a public key used for verifying a digital signature generated by the private authorization key of the master user.

At 204, a public authorization key is received by the ICC. At 206, a public authorization key input function is called to input the public authorization key to the memory 202. At 208, whether the memory of the ICC is a one-time programmable (OTP) memory is determined. The OTP memory permits data to be written to the memory only once. When a master user inputs a new public authorization key to the ICC, any previously stored identity information and cryptographic key pairs can be erased to ensure that the new public authorization key does not control users whose information had been previously entered. Therefore, if the memory is OTP, the public authorization key can be encrypted and input to the memory at 212. Otherwise, the content of the memory is cleared at 210 before the public authorization key is encrypted and input to the memory. After 212, the process 200 ends at 214.

Figure 3:
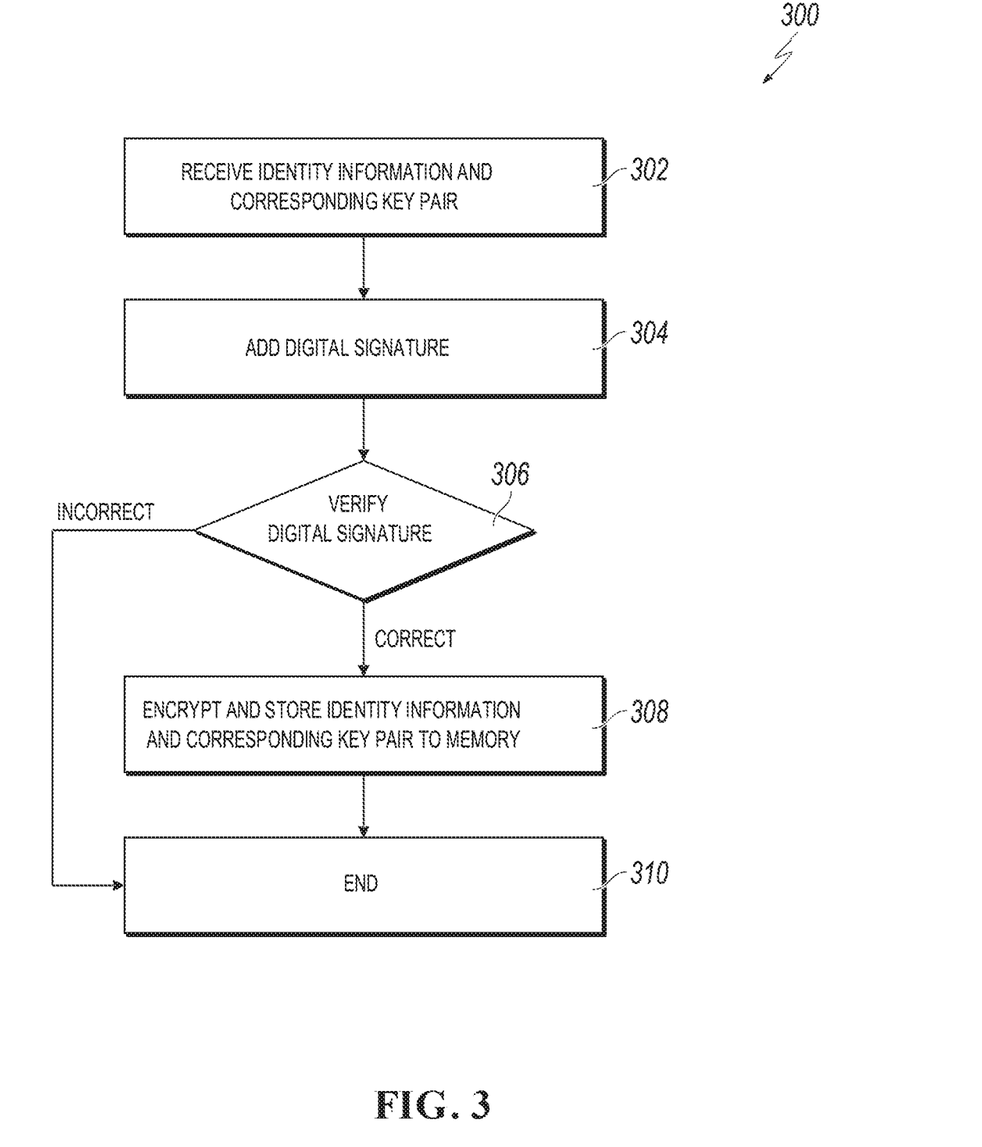
FIG. 3 is a flowchart illustrating an example of a process for information input to an identity cryptographic chip in accordance with embodiments of this specification.

FIG. 3 is a flowchart illustrating an example of a process 300 for information input to an ICC in accordance with embodiments of this specification. After the ICC is initialized, a master user can authorize users to store respective identity information and cryptographic key pairs to the ICC. As such, the authorized users can use the ICC to securely perform cryptographic operations.

At 302, identity information and a cryptographic key pair are received by the ICC. In some embodiments, the identity information can be collected by a computing device communicably coupled with the ICC. Example computing devices can include, an IoT device, a smart band, a smart watch, a laptop (or a desktop computer), and a smartphone. In some embodiments, the identity information can be the biometric information of the user, such as fingerprint, voiceprint, heartbeat, and iris information. The computing device can include a fingerprint sensor, microphone, heartbeat sensor, or iris scanner to collect the biometric information. For example, the computing device can be a smart watch that can collect heartbeat information of the user. The heartbeat information can be used as identity information for identifying the user. After the identity information is collected, it can be sent with the cryptographic key pair of the user to the ICC. In some embodiments, the ICC can communicate with the computing device wirelessly based on a wireless communication protocol, such as Bluetooth, near field communications (NFC), Wi-Fi, or cellular data. In some embodiments, the ICC can be inserted or integrated to the computing device to perform wired communication with the computing device.

At 304, a digital signature is added to the identity information and the cryptographic key pair. In some embodiments, the master user can add the digital signature to the identity information and the cryptographic key pair that belong to an authorized user. The private key used to generate the digital signature can be a private authorization key. The private authorization key belongs to the same key pair as the public authorization key stored in the ICC during the ICC initialization process 200 as discussed in the description of FIG. 2.

At 306, the digital signature is verified based on the public authorization key. If the digital signature is correct, the identity information and the cryptographic key pair are encrypted and stored to the memory of the ICC at 308. Afterwards, the process 300 ends at 310. If the digital signature is incorrect, the request is declined, and the process 300 ends at 310. After the identity information and cryptographic key pair of the user are input to the ICC, the user can use the ICC to securely perform cryptographic operations.

Figure 4:
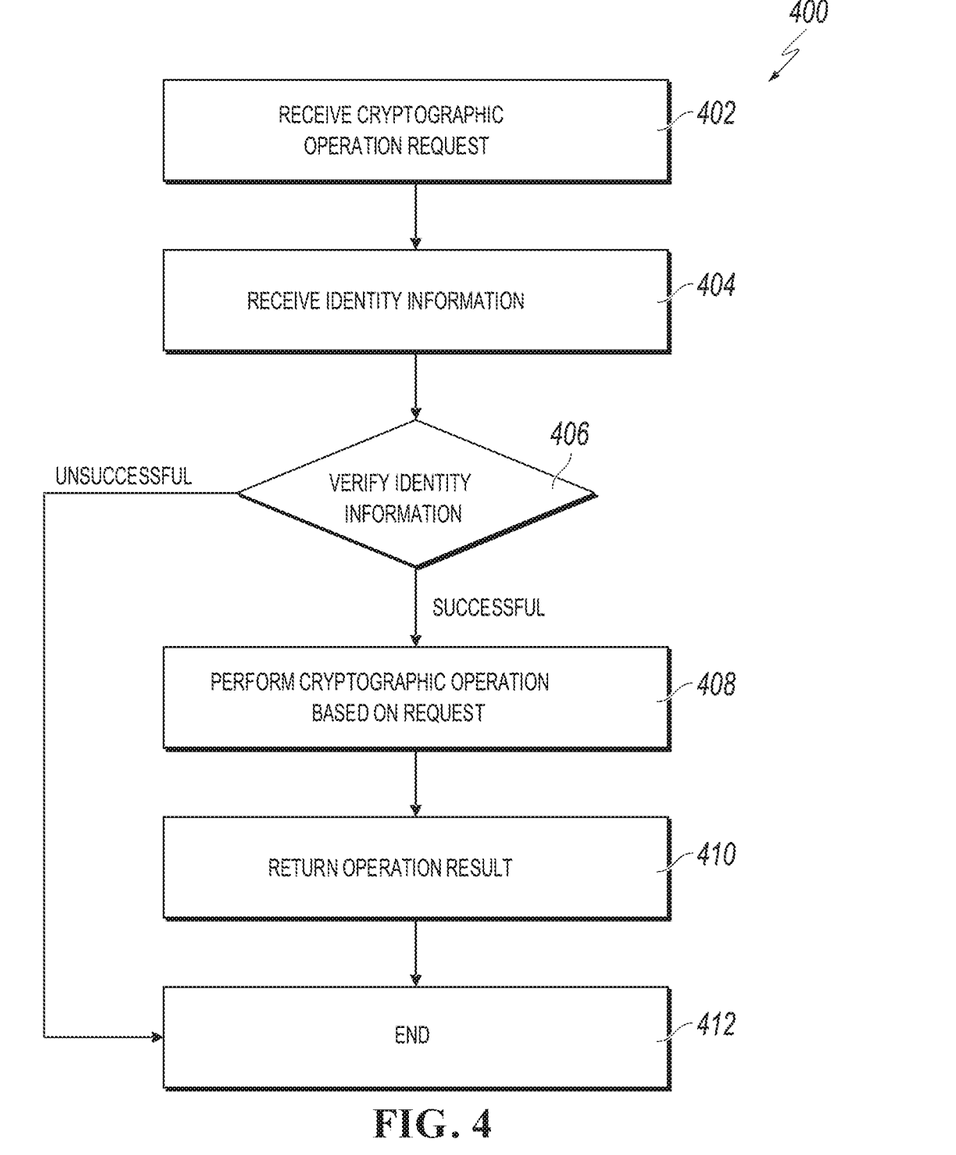
FIG. 4 is a flowchart illustrating an example of a process for performing a cryptographic operation using an identity cryptographic chip in accordance with embodiments of this specification.

FIG. 4 is a flowchart illustrating an example of a process 400 for performing a cryptographic operation using an ICC in accordance with embodiments of this specification. At 402, a request for performing a cryptographic operation is received. Examples of cryptographic operations can include data encryption, data decryption, and adding digital signature.

At 404, identity information of a user is received. As discussed in the description of FIG. 3, the identity information can be collected by a computing device and sent to the ICC. At 406, the identity information can be verified. In some embodiments, the identity information can be compared with the identity information stored in the memory of the ICC. If the identity information matches the stored identity information, the verification is successful, and the requested cryptographic operation can be performed at 408 using the cryptographic key pair stored in the memory of the ICC. Otherwise, the process 400 ends at 412. After 408, the process 400 proceeds to 410 where the operation result is returned. The operation result can depend on the cryptographic operation performed at 408. For example, if the cryptographic operation is file encryption, a file encrypted using the public key of the user can be returned. Similarly, if the cryptographic operation is file decryption, a file decrypted using the private key of the user can be returned. If the cryptographic operation is adding digital signature, a file with a digital signature of the user is generated using the private key, and is returned. After 410, the process ends at 412.

Figure 5:
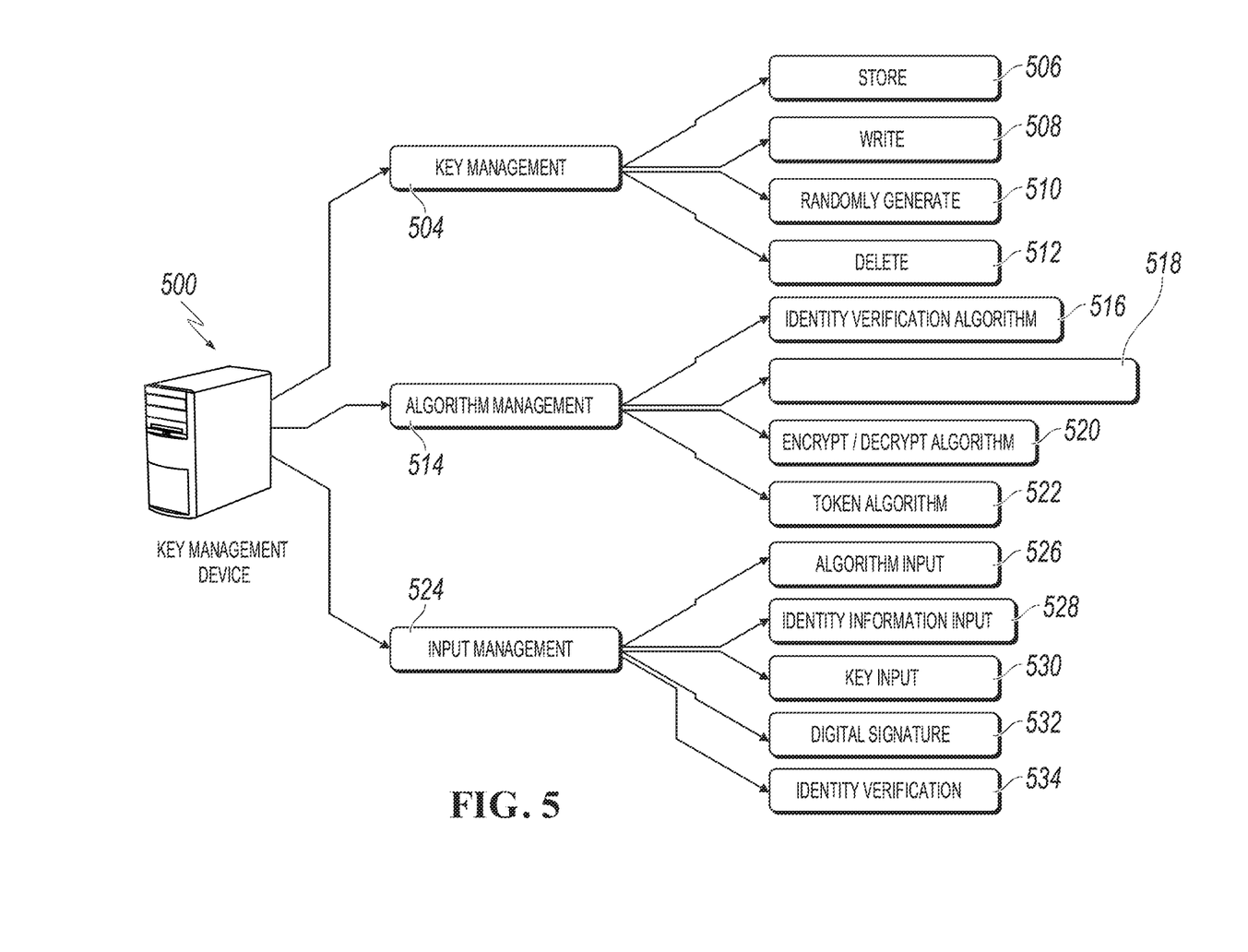
FIG. 5 is a diagram illustrating an example of a key management device in accordance with embodiments of this specification.

FIG. 5 is a diagram illustrating an example of a key management device 500 in accordance with embodiments of this specification. In some embodiments, the cryptographic key pairs used by the ICC to perform cryptographic operations for the users can be managed by a key management device 500. The key management device 500 can perform key management 504 and algorithm management 514. Key management 504 can include store 506, write 508, randomly generate 510, and delete 512 cryptographic key pairs. Cryptographic keys can include the asymmetric-key pair (including the public authorization key) associated with the master user and the cryptographic key pairs associated with authorized users of an ICC to perform cryptographic operations.

The algorithms managed by the algorithm management 514 can include storing and managing identity verification algorithm 516, digital signature verification algorithm 518, encrypt and decrypt algorithm 520, and token algorithm 522. The identity verification algorithm 516 can be used to perform the identity verification as discussed in the description of step 406 of FIG. 4. The digital signature verification algorithm 518 can be used to perform the digital signature verification, as described herein. The encrypt and decrypt algorithm 520 can be used to perform the requested cryptographic operation, as described herein. For example, if the requested cryptographic operation is an encryption operation of a user file, the encrypt and decrypt algorithm 520 can be performed to retrieve the public key of the user from the memory of the ICC and encrypt the user file. The token algorithm 522 can be used to manage a token indicative of a time limit or a quantity limit of performing requested cryptographic operations without needing to verify user identity. In some embodiments, a token can be generated and temporarily stored in the memory of the ICC. The token can provide authorizations for performing cryptographic operations for a number of times or in a predetermined time period without needing to verify user identity. For example, a token can be generated to provide authorizations to a user of the ICC for adding digital signatures to the next five files received or within the next three hours, whichever condition is met first. In some embodiments, the token can be cleared and removed from the ICC when it is expired or runs out.

In some embodiments, the key management device 500 can serve as backup of the ICC. Even if the ICC is lost or destroyed, the cryptographic keys and algorithms for performing cryptographic operations can be retrieved from the key management device 500.

In some embodiments, the key management device 500 can also perform input management 524. The key management device 500 can be communicably coupled to the ICC to manage algorithm input 526, identity information input 528, cryptographic key input 530, digital signature generation 532, and identity verification 534.

Figure 6:
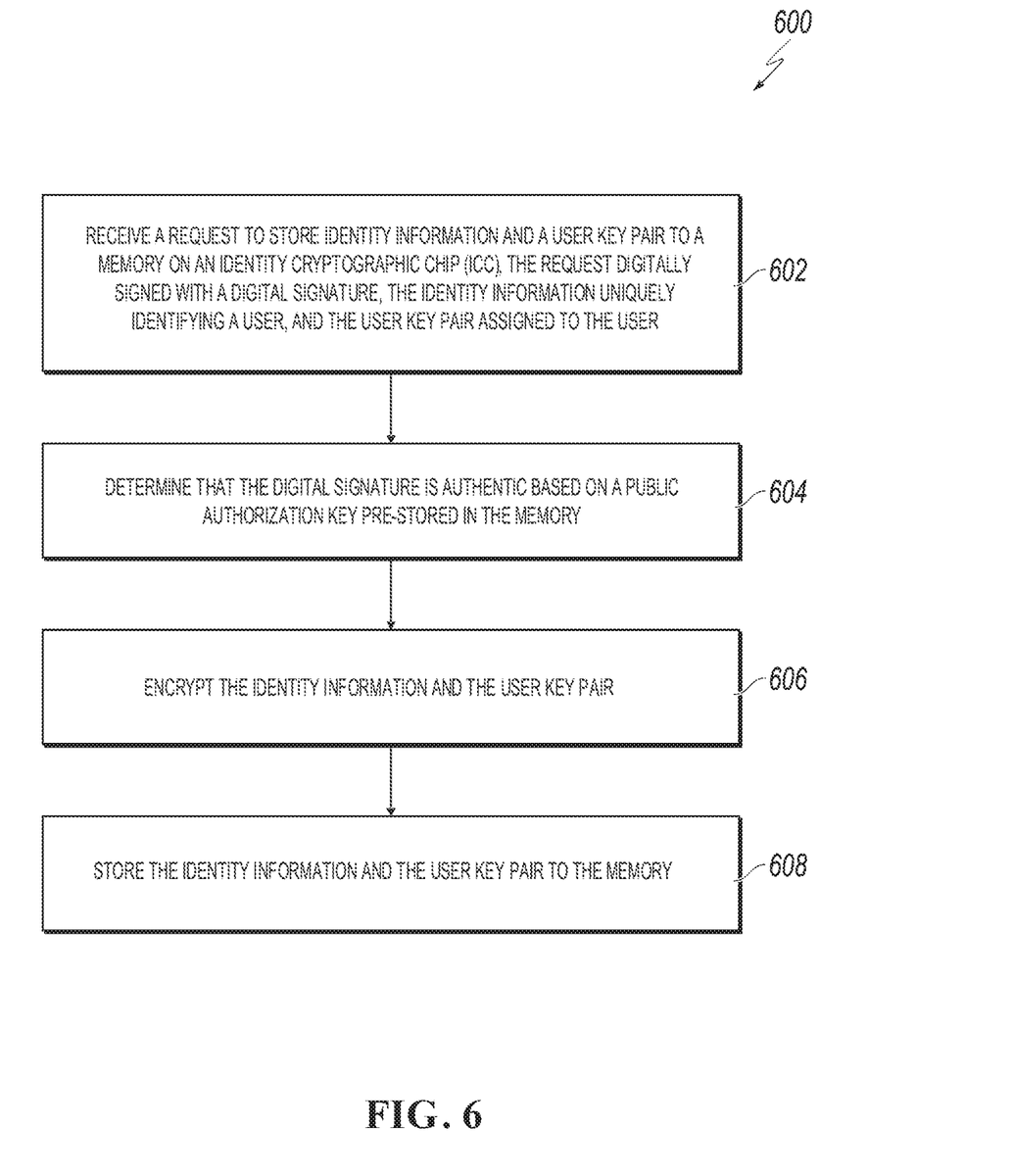
FIG. 6 depicts an example of a method that can be executed in accordance with embodiments of this specification.

FIG. 6 depicts an example of a method 600 that can be executed in accordance with embodiments of this specification. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some embodiments, various steps of method 600 can be run in parallel, in combination, in loops, or in any appropriate order. In some embodiments, the method 600 can be performed by an ICC described in accordance with embodiments of this specification.

At 602, a request is received to store identity information and a user key pair to a memory on an ICC, the request digitally signed with a digital signature, the identity information uniquely identifying a user, and the user key pair assigned to the user. In some embodiments, the ICC is initialized by pre-storing the public authorization key and a private authorization key. The public authorization key and the private authorization key are an asymmetric-key pair assigned to a master user of the ICC. In some embodiments, initializing the ICC further comprises storing identity authentication code executable to authenticate the user based on the identity information. In some embodiments, initializing the ICC comprises: storing first cryptographic operation code executable to add the digital signature based on the private authorization key; and storing second cryptographic operation code executable to perform file encryption or file decryption based on the user key pair.

In some embodiments, the request for storing identity information and the user key pair is a first request, the identity information is first identity information, the digital signature is a first digital signature, and the computer-implemented method further comprises: receiving second identity information and a second request for adding a second digital signature to a file; authenticating the second request based on matching the second identity information to the first identity information; and adding the second digital signature to the file based on the first cryptographic operation code and a private key of the user key pair. In some embodiments, the request for storing identity information and the user key pair is a first request, the identity information is first identity information, and the method 600 further comprises: receiving second identity information and a second request for encrypting or decrypting a file; authenticating the user based on matching the second identity information to the first identity information; and performing the encryption or decryption based on the second request, the second cryptographic operation code, and a public key or a private key of the user key pair. In some embodiments, the identity information is biometric information associated with the user.

At 604, the digital signature is determined authentic based on a public authorization key pre-stored in the memory. In some embodiments, the memory is a programmable read-only memory (PROM), an electrically erasable PROM or a flash memory, and wherein the identity information and the user key pair are stored in separate storage units of the memory.

At 606, the identity information and the user key pair are encrypted. At 608, the identity information and the user key pair are stored to the memory.

Figure 7:
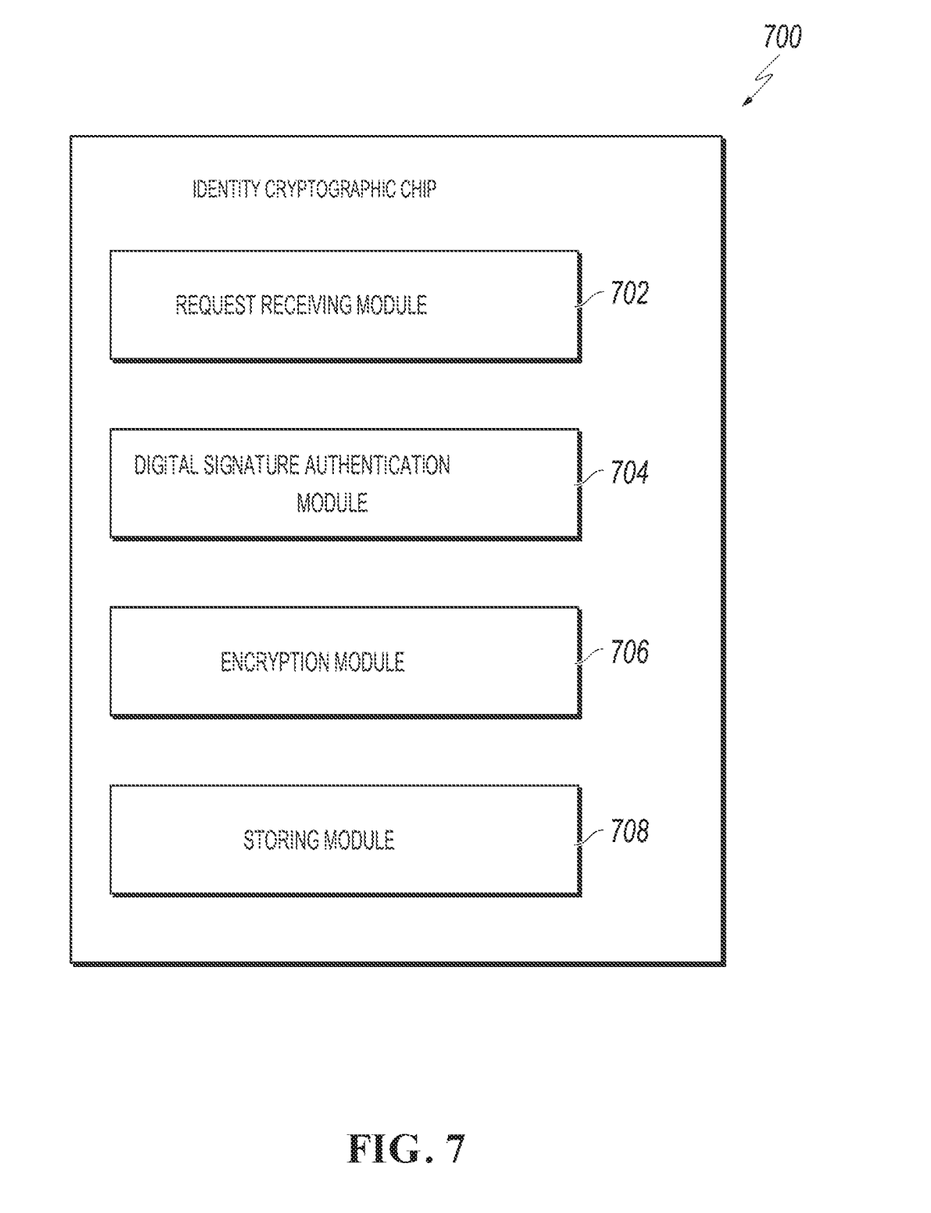
FIG. 7 depicts examples of modules of an apparatus in accordance with embodiments of this specification.

FIG. 7 depicts examples of modules of an apparatus 700 in accordance with embodiments of this specification. The apparatus 700 can be an example of an embodiment of an ICC. The apparatus 700 can correspond to the embodiments described above, and the apparatus 700 includes the following:

A request receiving module 702 to receive a request to store identity information and a user key pair to a memory on an ICC, the request being digitally signed with a digital signature, the identity information uniquely identifying a user, and the user key pair being assigned to the user. A digital signature determination module 704 to determine that the digital signature is authentic based on a public authorization key pre-stored in the memory. An encryption module 706 to encrypt the identity information and the user key pair.

A storing module 708 to store the identity information and the user key pair to the memory.

In an optional embodiment, the apparatus 700 includes a chip initialization module to initialize the ICC by pre-storing the public authorization key and a private authorization key corresponding to the public authorization key. The public authorization key and the private authorization key is an asymmetric-key pair assigned to a master user of the ICC.

In an optional embodiment, the memory is a programmable read-only memory (PROM), an electrically erasable PROM or a flash memory, and wherein the identity information and the pair of asymmetric keys are stored in separate storage units of the memory. In an optional embodiment, the identity information is biometric information.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

The techniques described in this specification produce several technical effects. For example, embodiments of the subject matter permit a master user to control and give permissions to other users to use an ICC. The authorization can be given by adding a digital signature to the authorized users' identity and cryptographic key information using the master user's private key. The ICC will reject identity and cryptographic key information input, if the digital signature cannot be authenticated by the master user's public authorization key pre-stored in the ICC.

To request the ICC to perform cryptographic operations, a user's identity information needs to be collected and verified against the identity information previously authenticated and stored in the ICC. As such, it can be ensured that the user who requested the cryptographic operation is an authorized user.

Moreover, the identity information and cryptographic keys can be encrypted before storing to the memory of the ICC. The information is only decrypted in the ICC to perform corresponding identity verification and cryptographic operations. The cryptographic operations are performed inside of the ICC and only the operational result is output from the ICC. Therefore, user identity information and cryptographic keys are secure and cannot be revealed even if the ICC is hacked or reverse engineered. In some embodiments, a key management device can be used to store the identity information and cryptographic keys in ciphertext to provide backup to the ICC and further enhance data security.

A computing device can be used to collect user identity information and initiate request for cryptographic operations. The ICC can communicate with the computing device wirelessly through various communications protocols, or it can be integrated or inserted to the computing device to be easily used for secured cryptographic operations.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising
receiving, by an identity cryptographic chip (ICC), a request to input a public authorization key;
in response to receiving the request to input the public authorization key, resetting, by the ICC, the ICC;
after resetting the ICC, receiving, by the ICC, the public authorization key;
in response to receiving the public authorization key, determining, by the ICC, memory of the ICC is not a type of one-time programmable (OTP) memory;
in response to determining the memory of the ICC is not the type of OTP memory, erasing, by the ICC, the memory of the ICC;
encrypting, by the ICC, the public authorization key as an encrypted public authorization key; and
inputting, by the ICC, the encrypted public authorization key to the memory of the ICC.

2. The computer-implemented method of claim 1, wherein resetting the ICC comprises:
reconfiguring settings of a logic computing component of the ICC to default.

3. The computer-implemented method of claim 1, wherein resetting the ICC comprises:
erasing identity information and cryptographic key pairs previously stored in the ICC.

4. The computer-implemented method of claim 1, comprising:
pre-storing the public authorization key and a private authorization key, wherein the public authorization key and the private authorization key are an asymmetric-key pair assigned to a master user of the ICC.

5. The computer-implemented method of claim 1, comprising:
storing identity authentication code executable to authenticate a user based on identity information.

6. The computer-implemented method of claim 1, comprising:
storing first cryptographic operation code executable to add a digital signature corresponding to a second request based on a private authorization key corresponding to the public authorization key; and
storing second cryptographic operation code executable to perform file encryption or file decryption based on a user key pair assigned to a user.

7. The computer-implemented method of claim 1, comprising:
receiving a second request to store, to the memory on the ICC, identity information and a user key pair, wherein the request is digitally signed with a digital signature, wherein the identity information uniquely identifies a user, and wherein the user key pair is assigned to the user;
determining that the digital signature is authentic based on the public authorization key;
encrypting the identity information and the user key pair; and
storing the identity information and the user key pair to the memory.

8. The computer-implemented method of claim 7, wherein the identity information is biometric information.

9. The computer-implemented method of claim 1, wherein the memory is a programmable read-only memory (PROM), an electrically erasable PROM or a flash memory.

10. A non-transitory, computer-readable storage medium storing one or more instructions executable by a computer system to perform operations comprising:
receiving, by an identity cryptographic chip (ICC), a request to input a public authorization key;
in response to receiving the request to input the public authorization key, resetting, by the ICC, the ICC;

after resetting the ICC, receiving, by the ICC, the public authorization key;

in response to receiving the public authorization key, determining, by the ICC, memory of the ICC is not a type of one-time programmable (OTP) memory;

in response to determining the memory of the ICC is not the type of OTP memory, erasing, by the ICC, the memory of the ICC;

encrypting, by the ICC, the public authorization key as an encrypted public authorization key; and inputting, by the ICC, the encrypted public authorization key to the memory of the ICC.

11. The non-transitory, computer-readable storage medium of claim 10, wherein resetting the ICC comprises:
reconfiguring settings of a logic computing component of the ICC to default.

12. The non-transitory, computer-readable storage medium of claim 10, wherein resetting the ICC comprises:
erasing identity information and cryptographic key pairs previously stored in the ICC.

13. The non-transitory, computer-readable storage medium of claim 10, comprising:
pre-storing the public authorization key and a private authorization key, wherein the public authorization key and the private authorization key are an asymmetric-key pair assigned to a master user of the ICC.

14. The non-transitory, computer-readable storage medium of claim 10, comprising:
storing identity authentication code executable to authenticate a user based on identity information.

15. The non-transitory, computer-readable storage medium of claim 10, comprising:
storing first cryptographic operation code executable to add a digital signature corresponding to a second request based on a private authorization key corresponding to the public authorization key; and
storing second cryptographic operation code executable to perform file encryption or file decryption based on a user key pair assigned to a user.

16. The non-transitory, computer-readable storage medium of claim 10, comprising:
receiving a second request to store, to the memory on the ICC, identity information and a user key pair, wherein the request is digitally signed with a digital signature, wherein the identity information uniquely identifies a user, and wherein the user key pair is assigned to the user;
determining that the digital signature is authentic based on the public authorization key;
encrypting the identity information and the user key pair; and
storing the identity information and the user key pair to the memory.

17. The non-transitory, computer-readable storage medium of claim 16, wherein the identity information is biometric information.

18. The non-transitory, computer-readable storage medium of claim 10, wherein the memory is a programmable read-only memory (PROM), an electrically erasable PROM or a flash memory.

19. A computer-implemented system, comprising:
one or more computing devices; and
one or more computer memory devices interoperably coupled with the one or more computing devices and having tangible, non-transitory, machine-readable media storing one or more instructions that, when executed by the one or more computing devices, perform one or more operations comprising:
receiving, by an identity cryptographic chip (ICC), a request to input a public authorization key;
in response to receiving the request to input the public authorization key, resetting, by the ICC, the ICC;
after resetting the ICC, receiving, by the ICC, the public authorization key;
in response to receiving the public authorization key, determining, by the ICC, memory of the ICC is not a type of one-time programmable (OTP) memory;
in response to determining the memory of the ICC is not the type of OTP memory, erasing, by the ICC, the memory of the ICC;
encrypting, by the ICC, the public authorization key as an encrypted public authorization key; and
inputting, by the ICC, the encrypted public authorization key to the memory of the ICC.

20. The computer-implemented system of claim 19, wherein resetting the ICC comprises:
reconfiguring settings of a logic computing component of the ICC to default.

* * * * *